United States Patent
Ray

[15] 3,655,905

[45] Apr. 11, 1972

[54] METHOD AND MEANS FOR KEEPING CABLES DRY

[72] Inventor: Jimmy C. Ray, Route 2, P.O. Box 33, Denison, Tex. 75020

[22] Filed: Jan. 4, 1971

[21] Appl. No.: 103,443

[52] U.S. Cl. ............................174/11 R, 174/6, 174/14 R, 174/16 R, 174/37, 204/196
[51] Int. Cl. ............................H02g 9/00, H02g 15/00
[58] Field of Search ............174/1, 6, 8, 11 R, 14 R, 15 C, 174/16 R, 17 VA, 21 R, 22 R, 23 R, 24, 37, 68 R, 70 R, 71 R, 135; 204/147, 196

[56] References Cited

UNITED STATES PATENTS

| | | | |
|---|---|---|---|
| 264,722 | 9/1882 | Mackintosh | 174/24 X |
| 1,710,313 | 4/1929 | Johnson | 174/21 R |
| 1,981,535 | 11/1934 | Zapf | 174/11 R |
| 2,259,129 | 10/1941 | Engster | 174/15 C |
| 2,859,270 | 11/1958 | Patchin | 174/16 R |
| 3,252,834 | 5/1966 | Vincent | 174/23 R X |
| 3,564,119 | 2/1971 | Thompson et al. | 174/16 R X |

FOREIGN PATENTS OR APPLICATIONS

| | | | |
|---|---|---|---|
| 530,404 | 12/1940 | Great Britain | 174/11 R |

*Primary Examiner*—Laramie E. Askin
*Attorney*—Charles W. Coffee

[57] ABSTRACT

The sheath around underground communication cables is opened at low points at frequent intervals. A sleeve is placed around the opening in the sheath and a tap in the sleeve drains fluid to a metalic cylinder. The cylinder contains a float valve so that water can drain from the cable into the cylinder and the cylinder is open at the bottom so the water may drain into the soil. The float valve prevents ground water from flowing into the cable. The cylinder may be electrically bonded to the sheath in which instance it acts as an anode for electrolytic corrosion protection.

13 Claims, 1 Drawing Figure

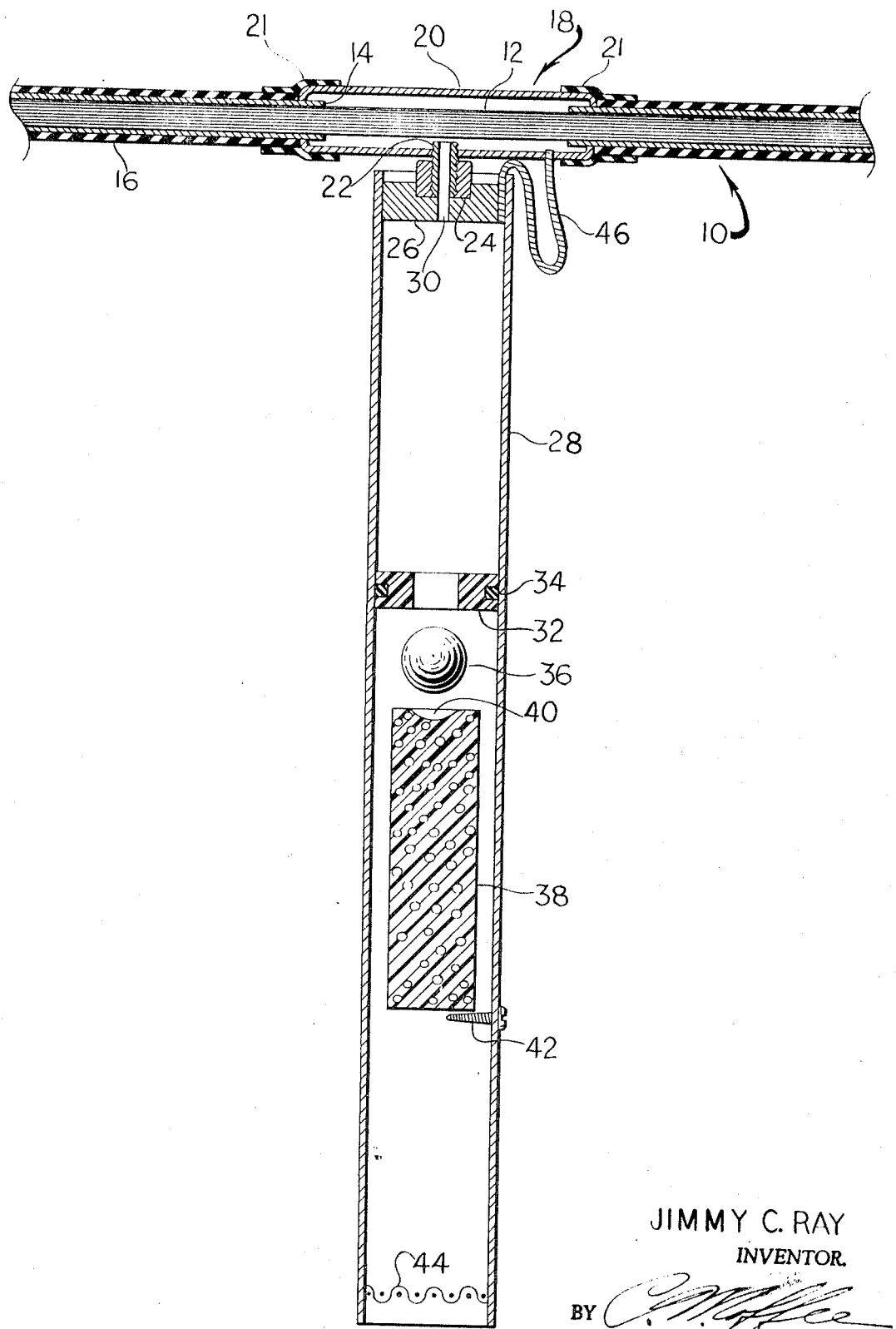

METHOD AND MEANS FOR KEEPING CABLES DRY

BACKGROUND OF THE INVENTION:

1. Field of the Invention

This invention relates to communications and more particularly to underground buried cables carrying a plurality of pairs of wires to transmit telephone communications.

2. Description of the Prior Art

In present day communications, electrical impulses carrying the communication are carried on pairs of wire and several hundred pairs of wire are bundled together and enclosed in a metal sheath, which is itself enclosed in a rubber or synthetic rubber sheath and buried under the ground. These cables are customarily spliced by cutting away the rubber and the metal sheath and after the splice is performed, placing a metal sheath over the open place and soldering the metal sleeve to the metal sheath. Normally a lead sleeve is used and it is also fluidly sealed to the rubber sheath. In heavily populated areas, such as in downtown metropolitan areas, the cable is then run in a masonry conduit, or perhaps in a metal conduit buried in the ground. However, in rural areas or less populated areas, the cable is buried directly in the ground.

Close to the central office, in some installations, a positive gas seal or dry gas is carried on the cable so the gas pressure on the inside of the metal and plastic sheath prevents moisture from entering the cable. However, at greater distances from the central office, the rubber and metal sheath themselves are expected to prevent the entry of moisture into the cable.

Because of various factors, often the cables do not remain impervious to passage of moisture. Then water enters the cables. It is detrimental when the water enters the cables. The moisture in the cable causes noise or static in communications.

SUMMARY OF THE INVENTION

1. New and Different Function

I have solved the problem by first discovering that these cables do often get moisture in them and second, by determining how to drain the moisture from the cables. I achieve this by making a rough determination of where the low points of the cable are. Often the cable will have a low point every thousand feet or so. Then at each low point a drain is installed. The drain includes a oneway float valve so the water can drain out of the cable, but no water can flow into the cable. I have discovered that what appears to be a siphoning action will occur; therefore, even though the exact low point of the cable is not precisely determined, the cable will drain. I have also discovered that it is desirable to place these drains periodically. I.e., even though there is no low point for a length of two thousand feet, it is desirable to place a drain about every 1,000 or 2,000 feet in the cable even though there is no low point. Certainly each time the cable is spliced in any event and a sleeve is placed on the cable, it is desirable to place a drain at that point. The drain tube is made of copper or zinc so that the valve body or cylinder also acts as an anode, giving electolytic corrosion protection to the cable sheath as is known.

2. Objects of this Invention

An object of this invention is to improve communications.

Another object of this invention is to drain water from underground cables.

A further object is to provide electrolytic corrosion protection for buried underground communication cables.

Other objects are to achieve the above with a device that is sturdy, compact, durable, lightweight, simple, safe, efficient, versatile, and reliable yet inexpensive and easy to manufacture, install, and maintain.

Still further objects are to achieve the above with a method that is versatile, rapid, efficient, and inexpensive, and does not require skilled people to install, adjust, and maintain.

The specific nature of the invention, as well as other objects, uses, and advantages thereof, will clearly appear from the following description and from the accompanying drawing, which is not necessarily to scale.

BRIEF DESCRIPTION OF THE DRAWING

The drawing is a sectional view of a typical installation embodying my invention.

DESCRIPTION OF THE PREFERRED EMBODIMENT

CATALOG OF ELEMENTS 10 cable
12 wires
14 sheath, metal
16 sheath, rubber
18 cut away
20 sleeve
21 tape — insulating
22 nipple
24 nut
26 head
28 cylinder
30 bore
32 valve seat
34 O-ring
36 ball
38 slug
40 depression
42 screw
44 screen
46 ground wire

DESCRIPTION OF THE PREFERRED EMBODIMENT

Referring to the drawing, cable 10 contains a plurality of pairs of insulated wires 12. The wires 12 are carried within metal sheath 14 which itself is encased in rubber sheath 16. It will be understood by those skilled in the art that this rubber sheath is probably a synthetic material and might be commonly called "plastic". As illustrated, the rubber sheath 16 and metal sheath 14 have been cut away in area 18. In this area, metal sleeve 20 has been applied over the cut away portion. The metal sleeve is bonded as by soldering or "wiping" to the sheath 14 on either end. In addition, the metal sleeve 20 is fluidly sealed to the rubber sheath 16 by adhesive tape 21 so that it is watertight if the connection is properly made. Thus, the sleeve 20 is electrically connected, water tight, to the metal sheath 14; furthermore, the sleeve 20 is bonded with a watertight joint to the rubber sheath 16.

What has been described above about the cable 10 and the sleeve 20 and their installation are standard telephone practices and the installation of sleeves on standard cables are well understood by those having skill in the art.

A small threaded nipple 22 is installed in the bottom, lower part of the sleeve. Nut 24 forming a portion of head 26 is threaded to the nipple 22. Valve body or tube or cylinder 28 is attached as by soldering to the head 26. The nut 24 is soldered or connected to the head 26 to form a watertight connection. The head 26 has a bore or opening 30 therethrough so there is an open passageway for moisture or water from the cable 10 into the cylinder 28.

About a third of the way from the top, valve seat 32 is installed in the cylinder 28. I have found synthetic, non-corrosive material suitable for this valve seat. The seat 32 is connected into the inside of the cylinder 28. The valve seat 32 is a thick disc and the outside diameter of the seat fits snugly in the inside bore or diameter of the cylinder 28. A notch with O-ring 34 in the circumferential wall of the valve seat 32 provides a watertight seal to the inside wall of the cylinder 28. Ball 36 forms a valve and is placed immediately below the valve seat 32. The valve ball 36 is also made of lightweight, synthetic material having good corrosion resistance and also having a specific gravity of less than one so that it floats in water. The cylinder 28 is mounted vertically, depending downwardly from the nipple 22. Therefore, in the event water should rise in the cylinder 28, the valve ball 36 will float and seat against valve seat 32, preventing water from rising above the valve seat 32.

In order to hold the valve ball 36 in place and to increase the pressure on the valve ball against seat 32, a float slug 38 is inserted into the cylinder 28 below the valve ball. The float slug 38 is made of synthetic foam material such as foamed polyurethane. Various and sundry float materials are well known to the arts, particularly to the water-sport arts. The upper surface of the slug 38 has a arcuate depression 40 so that it acts to guide the valve ball 36 into place. The slug 38 itself is held in place by a self-tapping screw 42 inserted through the wall of the cylinder 28 beneath the slug 38. The bottom of the cylinder 28 is closed by screen 44 to prevent rodents and the like from entering the bottom of the cylinder.

To determine where to install these devices, a survey of the cable route is made. Generally I have found that people normally experienced in laying these cables can make these surveys visually without the use of instruments. A rough sketch is made showing the elevations at 500-foot intervals (one-tenth of a mile) and the location of already projected sleeves marked. Then at each low point a sleeve with a drain cylinder is installed. Normally the drain cylinders will not be installed at closer intervals than 1,000 feet. Also, normally, even though there is not a detected low point, a drain cylinder should be installed about every 2,000 feet. If the drain is to be installed at a location not otherwise having a splice and sleeve, the metal sheath 14 and rubber sheath 16 need only be opened by slitting at the bottom and the sleeve 20 installed over the opening so made.

I have found that even though the drain cylinders are not installed at an exact low point, there will be a "siphon" action which will drain the moisture from the cable and maintain the cable dry even though the drains are not precisely located.

Normally, the installation of communication cables will be designed by technical personnel and perhaps the installation will be supervised by technical personnel. In any event, these engineers will determine whether or not it is desired to use the cylinder body 28 as a ground or anode. If it is determined that the cable 10 will not be "grounded" at the drain, the nipple 22 will be made of a nonconductive material such as Nylon and ground wire 46 will not be connected to the sleeve 20. If it is desired that the cable 10 will be grounded at this point and the cylinder 28 serve as an anode for electrolytic corrosion protection, then the ground wire 46 will be electrically bonded to the cable 10.

As seen in the drawing, one end of the wire 46 inserts into a notch existing between the head 26 and the sleeve 28. The bonding of the ground wire 46 to the cable can be done in two manners. As illustrated in the drawing, the ground wire 46 is bonded directly to the sleeve 20. Another method of installation (which has not been illustrated in the drawing), is that another ground wire could be connected to the sleeve 20 and extended upward to an above-ground post and the two wires electrically bonded together above the ground. As stated, the decision as to what type of bonding would be used is made by the technical personnel designing the installation of the cable.

Normally, the sleeve 28 will be made of copper. However, if the technical personnel designing the cable specifies, it may be made of zinc.

Also, the installation of these devices will be in a pit dug for that purpose and the pit will be filled with "pea gravel" so the water from the open end of the bottom of the sleeve is readily drainable.

Therefore, it may be seen that I have provided a device which not only drains the water from the cable, but also serves as an anode for electrolytic corrosion resistance to the cable.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example do not point out what an infringement of this patent would be, but are to enable the reader to make and use the invention.

I claim as my invention:
1. In an underground cable including
   a. a plurality of wires enclosed in a
   b. metal sheath,
   c. the improved structure to maintain the cable dry comprising:
      d. an opening in the metal sheath,
      e. a sleeve surrounding the opening
      f. sealed to the sheath,
      g. a depending nipple
      h. tapped into the bottom of the sleeve,
      j. a vertical cylinder
      k. depending from the nipple
      m. in fluid flowing relationship to the inside of the cable,
      n. said cylinder open at the bottom, and
      o. valve means in the cylinder for permitting water to flow out of the cable and cylinder and for preventing water from flowing into the upper portion of the cylinder and into the cable.
2. The invention as defined in claim 1 with the additional limitation of
   p. a screen in the bottom of the cylinder.
3. The invention as defined in claim 1 with the additional limitations of
   p. a ground wire electrically connecting the cylinder to the sleeve,
   q. said cylinder being made of copper.
4. The invention as defined in claim 1 wherein said valve means includes
   p. a valve seat sealed within the cylinder,
   q. a ball valve below the seat,
   r. said ball valve having a specific gravity less than one so that it floats in water, and
   s. a float slug below the ball valve to help force it up on said seat.
5. The invention as defined in claim 4 wherein said valve seat is
   t. a synthetic disc with
   u. an O-ring in its circumferential wall sealed to the cylinder.
6. The invention as defined in claim 5 with the additional limitations of
   v. a ground wire electrically connecting the cylinder to the sleeve,
   w. said cylinder being made of copper.
7. The invention as defined in claim 6 with the additional limitation of
   x. a screen in the bottom of the cylinder.
8. The method of maintaining dry underground cables, said cables including
   a. a plurality of wires enclosed in a
   b. metal sheath,
   c. comprising the steps of:
      d. opening the metal sheath at periodic intervals,
      dd. and at each opening,
      e. placing a sleeve around the opening,
      f. sealing the sleeve to the sheath,
      g. tapping the bottom of the sleeve,
      h. permitting liquids to flow from the sleeve through the tap, and
      j. responsive to the level of liquid outside the sleeve preventing liquids from flowing into the sleeve from the tap.
9. The invention as defined in claim 8 with the additional limitations of
   k. said metal sheath enclosed in a rubber sheath and
   m. sealing said sleeve to said rubber sheath.
10. The invention as defined in claim 8 with the additional limitation of
    k. electrically bonding the sleeve which is metal to a cylinder which cylinder is also used in said prevention of liquids from flowing into the sleeve.
11. The invention as defined in claim 8 with the additional limitation of
    k. placing said sleeves at low points in the cable.

12. The invention as defined in claim 11 with the additional limitation of
   m. electrically bonding the sleeve which is metal to a cylinder which cylinder is also used in said prevention of liquids from flowing into the sleeve.

13. The invention as defined in claim 12 with the additional limitations of
   n. said metal sheath enclosed in a rubber sheath and
   o. sealing said sleeve to said rubber sheath.

* * * * *